United States Patent [19]

Marchent et al.

[11] Patent Number: 4,546,550

[45] Date of Patent: Oct. 15, 1985

[54] COMPASS

[75] Inventors: Brian G. Marchent, Portsmouth; Michael R. Foster, Salisbury, both of England

[73] Assignee: Plessey Overseas Ltd., Ilford, England

[21] Appl. No.: 541,052

[22] Filed: Oct. 12, 1983

[30] Foreign Application Priority Data

Oct. 12, 1982 [GB] United Kingdom ............... 8229134

[51] Int. Cl.⁴ ............................................. G01C 17/38
[52] U.S. Cl. ......................................... 33/356; 33/361; 33/363 R
[58] Field of Search ............. 33/363 R, 352, 355 R, 33/356, 357, 361, 362

[56] References Cited

U.S. PATENT DOCUMENTS

| | | | |
|---|---|---|---|
| 3,991,361 | 11/1976 | Mattern et al. | 33/356 |
| 4,143,467 | 3/1979 | Erspamer et al. | 33/356 |
| 4,179,741 | 12/1979 | Rossani | 33/356 |
| 4,300,390 | 11/1981 | Shimizu | 33/361 |
| 4,412,387 | 11/1983 | Lenko | 33/363 |
| 4,413,424 | 11/1983 | Sasaki et al. | 33/361 |
| 4,414,753 | 11/1983 | Moulin et al. | 33/356 |
| 4,429,469 | 2/1984 | Tsushima et al. | 33/361 |

FOREIGN PATENT DOCUMENTS 2020037 11/1979 United Kingdom.
1579673 11/1980 United Kingdom.

*Primary Examiner*—Willis Little
*Attorney, Agent, or Firm*—Fleit, Jacobson, Cohn & Price

[57] ABSTRACT

An electronic compass for vehicles comprising at least two magnetic sensors arranged in use to be respectively responsive to orthogonal horizontal components of a magnetic field which includes the earth's magnetic field and a spurious magnetic field which is associated with the vehicle, for producing electrical signals corresponding to said components, data storage means arranged to store signals derived from the sensors as the vehicle is rotated in the horizontal plane during a compass setting cycle, and signal processor means responsive to electrical signals produced by the sensors after the setting cycle has been completed and to the signals stored during the setting cycle, for providing output signals indicative of the bearing appertaining to the heading of the vehicle in which the effects of the spurious magnetic field are compensated for.

6 Claims, 9 Drawing Figures

COMPASS

BACKGROUND

This invention relates to electronic compasses and to navigation systems including such compasses and more especially it relates to such compasses and navigation systems for use in vehicles.

The term vehicle when used herein is intended to include ships, boats and aircraft as well as land based vehicles such as cars, lorries or military vehicles and the term electronic compass as used herein defines a compass in which a bearing indication is afforded in dependence upon electronic signals provided by magnetic sensors responsive to the earths magnetic field.

Modern vehicles are constructed principally from steel or include significant steel parts having magnetic characteristics which distort the earth's magnetic field in and around the close proximity of the vehicle. Although electronic compasses per se are known, their use has hitherto been strictly limited in vehicles, since magnetic sensors essential to such compasses must either be placed on masts or extension arms in order to avoid spurious magnetic fields associated with the vehicle and the use of masts or the like is often not possible or at least undesirable or be subjected to an elaborate compensation process.

An important object of the present invention is to provide for a vehicle an electronic compass or a navigation system including such a compass, wherein spurious magnetic fields associated with the vehicle are compensated for, such that magnetic sensors forming a part of the compass may be accommodated within or close to the vehicle in which the compass is carried.

SUMMARY OF THE INVENTION

According to the present invention an electronic compass for vehicles comprises at least two magnetic sensors arranged in use to be respectively responsive to two orthogonal components of a magnetic field which includes the earth's magnetic field and a spurious magnetic field which is associated with the vehicle, for producing electrical signals corresponding to said components, data storage means arranged to store signals derived from the sensors as the vehicle is turned through all headings during a compass setting cycle, and signal processor means responsive to electrical signals produced by the sensors after the setting cycle has been completed and to the signals stored during the setting cycle, for providing output signals indicative of the bearing appertaining to the heading of the vehicle in which the effects of the spurious magnetic field are compensated for.

By driving the vehicle through 360° during the compass setting cycle, data is made available and stored, subsequently to be utilised by the signal processor to compensate for the spurious magnetic field associated with the vehicle, whereby the provision of signals indicative of a magnetic compass bearing appertaining to the heading of the vehicle is facilitated.

A spurious magnetic field associated with a vehicle may be considered to be the combination of a permanent magnetic field and an induced magnetic field, and by utilising signal values sensed and stored during the compass setting cycle or during operation, a transform is derived which is applied in the signal processor to provide compensation at least to a first approximation for the permanent magnetic field and the induced magnetic field associated with the vehicle, even if these fields are very large, whereby the provision of an unambiguous bearing indication is afforded.

Although a transform utilising a set of stored values sufficient to define the magnetic characteristics sensed during a complete 360° setting cycle may be used, a comparatively simple transform is preferable which utilises a a set of four values corresponding to the maximum and minimum values sensed by the two sensors responsive respectively to orthogonally disposed generally horizontal magnetic fields to afford a bearing indication to a first approximation.

Accordingly the data storage means may include capacity to store data corresponding to or derived from the maximum and minimum values sensed by the sensors during the setting cycle, these values being defined as Ax max, Ax min, Ay max and Ay min, and the signal processor means may be adapted to solve the equation $\tan^{-1} \theta = Cy/Cx$ in which the signs of Cx and Cy are used to define $\theta$ over the range 0° to 360° where $\theta$ is the bearing angle, $$Cx = \frac{Ax - Px}{Ix} \text{ and } Cy = \frac{Ay - Py}{Iy}; \text{ where}$$

$$Px = \frac{Ax\,max + Ax\,min}{2} \text{ and } Py = \frac{Ay\,max + Ay\,min}{2}; \text{ where}$$

$$Ix = \frac{Ax\,max - Ax\,min}{2} \text{ and } Iy = \frac{Ay\,max - Ay\,min}{2};$$

and where Ay and Ax are signals derived from respective sensors during operation.

Thus Px, Py, Ix and Iy may be stored and utilised in the signal processor thereafter to derive a signal indicative of the bearing $\theta$.

In order to provide for a more accurate indication of bearing, a comprehensive set of data derived from the sensors as the vehicle is driven through 360° may be stored which may be utilised by the signal processor means in a further transform.

Alternatively however in order to provide this more accurate bearing indication $\theta$, the data storage means may include further capacity for two further values derived during a second 360° setting cycle, the signal processor means being adapted to utilise the values to solve the equation $\theta = \tan^{-1} Y1/X1$ in which the signs of X1 and Y1 are used to define $\theta$ over the range 0° to 360° where $X_1 = \sqrt{\frac{1}{2}} (Fx - Fy)$ and $Y_1 = \sqrt{\frac{1}{2}} (Fx + Fy)$;

where $Fx = \frac{Ex}{Jx}$ and $Fy = \frac{Ey}{Jy}$ where $Ex = \sqrt{\frac{1}{2}} (Cx + Cy)$ and $Ey = \sqrt{\frac{1}{2}} (Cy - Cx)$ where Jx=Ex max and Jy=Ey max; and where the said two further values correspond to or are derived from Jx and Jy.

The electronic compass may comprise switch means via which signals derived from the sensors are fed either to the data storage means or to the signal processor.

If the signal processor means is adapted to derive the bearing $\theta$ to a first approximation, the switch means comprises two positions one of which is used during the setting cycle for the transfer of signals derived from the sensors and corresponding to or derived from Ax max, Ax min, Ay max and Ay min, to the store and the other of which is used during normal operation for the transfer of signals derived from the sensors to the signal processor.

If alternatively the signal processor is adapted to provide the more accurate bearing indication $\theta$ the switch means may have an additional position used during the second setting cycle for the transfer of signals derived from the sensors and corresponding to or derived from Jx and Jy to the store.

The magnetic sensors may comprise any conventional magnetometer element but according to one embodiment the sensors may comprise a fluxgate sensor consisting of two orthogonally disposed detector coils operatively associated with a common core and oscillator means adapted to provide drive signals for a drive winding operatively associated with the core at half the frequency of detector signals which are fed by synchronous detector means arranged to receive signals from the detector coils and two orthogonal feedback coils around the core.

The synchronous detector means may be arranged to feed A/D converters one for each sensor the switch means being fed from the A/D converters.

The sensors may be arranged so that one is responsive to the axial magnetic field component along the length of the vehicle and the other is responsive to the transverse magnetic field component across the vehicle at right angles to the axial magnetic field component.

BRIEF DESCRIPTION OF THE DRAWINGS

One embodiment of the invention will now be described solely by way of example with reference to the accompanying drawings in which.

DETAILED DESCRIPTION

Figure 1:
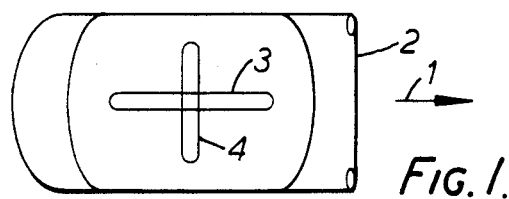
FIG. 1 is a somewhat schematic plan view of a vehicle embodying orthogonally disposed magnetic sensors.
Figure 2:
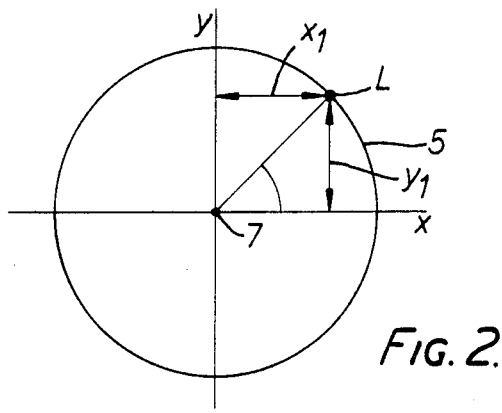
FIG. 2 is a diagram of the locus of a point representing the output of the sensors when the vehicle of FIG. 1 is driven through 360° in the presence of the earths magnetic field only, without a spurious field being effectively present.

Referring now to FIG. 1, in order to determine the bearing or heading as indicated by an arrow 1 relative to magnetic North of a vehicle 2, a pair of magnetic sensors 3 and 4 are provided responsive respectively to orthogonally disposed axial and transverse components of the local magnetic field to which the sensors 3 and 4 are exposed. The local magentic field is a combination of the earths magnetic field and a spurious magnetic field. If no spurious magnetic field were present and the component of earths magnetic field associated with the longitudinal axis of the vehicle as sensed by the sensor 3 were represented on the x axis and plotted against the transverse field as sensed by the sensor 4 represented on the y axis, then a circular locus 5 as shown in FIG. 2 would be produced as the vehicle 2 is turned through 360°. Thus if for example the vehicle heading or bearing relative to magnetic North were 45° as indicated by the point L on the locus 5, the bearing $\theta$ would be characterised by X and Y sensor outputs from the sensors 3 and 4 of $X_1$ and $Y_1$ respectively such that $\theta = \tan^{-1} Y1/X1$ in which the signs of X1 and Y1 are used to define $\theta$ over the range 0° to 360°.

Figure 3:
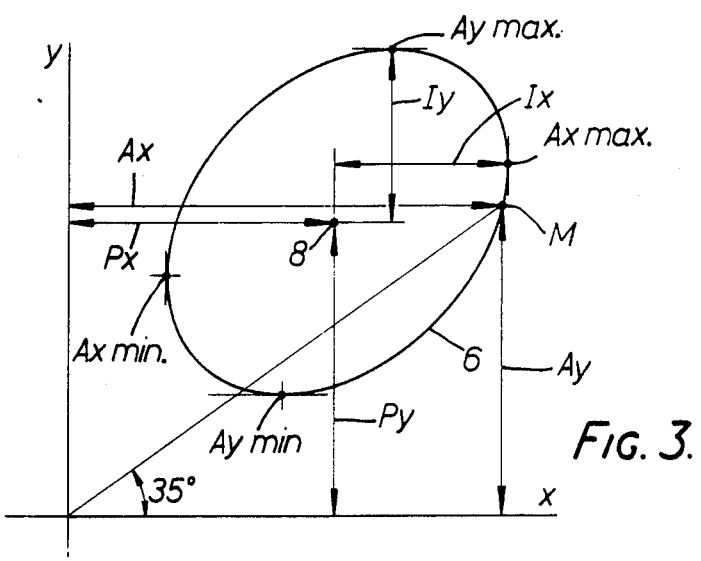
FIG. 3 is a diagram of the locus of a point representing the output of the sensors of FIG. 1 when the vehicle shown in FIG. 1 is driven through 360° in the presence of both the earths magnetic field and a spurious magnetic field.

In practice however the perfect circular locus as shown in FIG. 2 is distorted by a spurious magnetic field thereby to produce a resultant locus 6 as shown in FIG. 3 in which a bearing corresponding to the bearing of 45° defined by the point L on the locus 5 is transformed to a corresponding point M on the locus 6 which corresponds in this example to about 35° and is therefore in error.

In order to correct for this error, a transform is applied to the signal sensed by the sensors 3 and 4 which lie on the locus 6 so that they are transformed to correspond with the signals which correspond to or approximate to the signals defining the ideal locus 5 of FIG. 2.

The spurious magnetic field may be considered to comprise two components namely a permanent magnetic field component and an induced magnetic field component. The permanent magnetic field component serves to move the point of origin 7=(Xo, Yo), of the ideal locus 5, to a point 8=(Px, Py), as shown in FIG. 3 and the induced magnetic field has the effect of distorting the ideal circular locus to an elliptical shape corresponding for example to the elliptical shape of the locus 6 as shown in FIG. 3.

Transforms will now be considered for compensating either to a first approximation for the spurious magnetic field or for providing total compensation thereby to provide an accurate indication of bearing.

Figure 4:
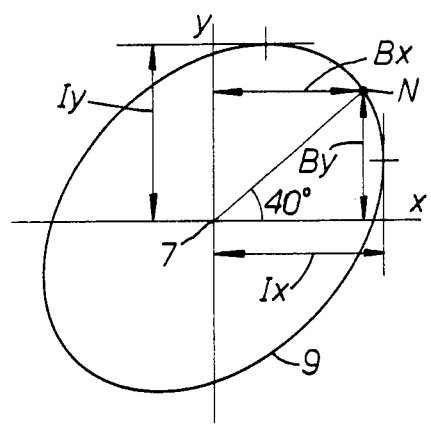
FIG. 4 is a diagram representing the locus of a point representing the outputs from the sensors as modified by a first stage of a two stage transform which gives the bearing O which corresponds to the bearing of the vehicle to a first approximation.

In order to compensate for the permanent magnetic field component, the point M of FIG. 3 must be transformed to a corresponding point N=(Bx, By), which in this case lies at an angle of approximately 40° on a locus 9 as shown in FIG. 4, the origin of which is Xo, Yo, corresponding to the point 7. This transform can be effected by subtractng the co-ordinates (Px, Py), of the origin 8 of the locus 6 from the co-ordinates (Ax, Ay), of the point M. Thus N=(Ax−Px,Ay−Py). The coordinates of Px and Py are clearly not directly measurable but they may be represented in terms of the four extremities of the locus 6 which are Ay max, Ax max, Ay min and Ay min as shown in FIG. 3 and which are measurable as the vehicle is turned through 360° during a setting cycle.

Thus $$Px = \frac{Ax\max + Ax\min}{2} \text{ and } Py = \frac{Ay\max + Ay\min}{2}.$$

Thus Bx=Ax−Px and Py=Ay−Py and this expression may be represented in terms of Ax and Ay data which is obtained from the sensors during normal sensors operation and Px and Py data which is obtained from the sensor during the setting cycle and stored for subsequent use.

Figure 5:
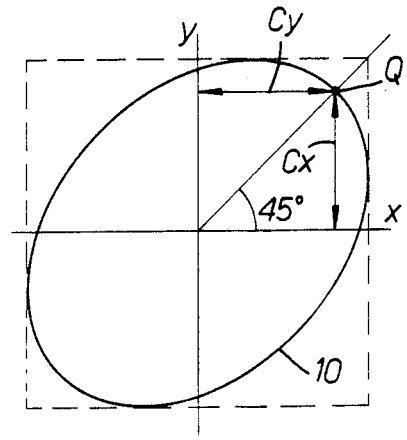
FIG. 5 is a diagram of a locus of a point representing the output from the sensors as modified by the second stage of the transform which gives the bearing O which is to a first approximation.

In order to provide first order compensation for the effects of the induced magnetic field component which produces elliptical distortion, a transform is applied to the locus 9 of FIG. 4 which constrains it to lie within a square centered on the origin Yo, Xo, as shown by the broken lines in FIG. 5, so that the point N of locus 9 is transformed to a point Q=(Cx, Cy), on a locus 10. This is achieved by scaling Bx and By in the ratio Ix and Iy to produce the expression $$Cx = \frac{Ax - Px}{Ix} \text{ and}$$

$$Cy = \frac{Ay - Py}{Iy} \text{ and } Cx = \frac{Bx}{Ix} \text{ and } Cy = \frac{By}{Iy} \text{ where}$$

$$Ix = \frac{Ax\max - Ax\min}{2} \text{ and } Iy = \frac{Ay\max - Ay\min}{2}$$

as can be seen from FIG. 3 and FIG. 4.

This transform defines the point Q in terms of Cx and Cy on an ellipse which is offset by 45° and so in the present case the bearing $\theta$ of the point L is 45° and this corresponds precisely with the bearing of the transformed point Q i.e. $\tan^{-1} \theta = Cy/Cx$.

It has been found that this first approximation transform to give the bearing $\theta$ as shown in FIG. 5 is satisfactory for many purposes but if a higher order of accuracy is required further transform stages may be applied as will hereinafter be described to fully compensate for the spurious magnetic field whereby O is derived.

Figure 6:
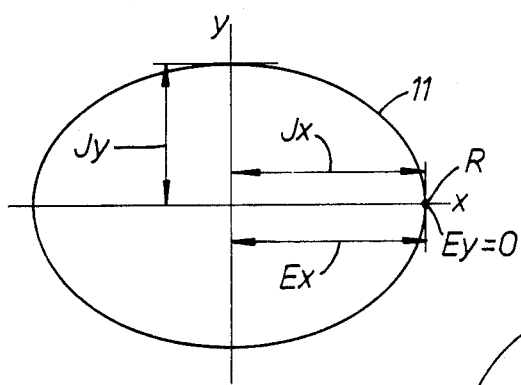
FIG. 6 is a diagram of a locus of a point representing the output of the sensors as modified by one stage of a further transform which given an accurate indication O of the bearing.

The first further transform stage is shown in FIG. 6 and comprises turning the locus 10 through 45° so as to produce a new locus 11 in which the point Q on the locus 10 is transformed to a new point R=(Ex, Ey), on the new locus where $$Ex = \sqrt{\frac{1}{2}} (Cx + Cy) \text{ and } Ey = \sqrt{\frac{1}{2}} (Cy - Cx).$$

Figure 7:
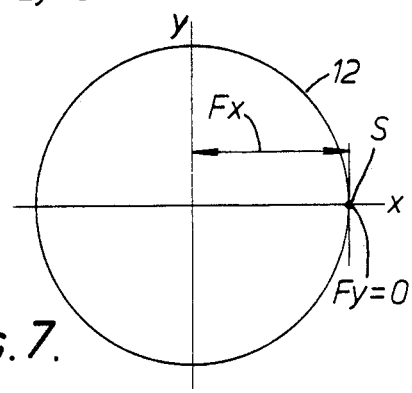
FIG. 7 is a diagram of the locus of a point representing the output of the sensors as modified by another stage of the transform which gives the accurate bearing indication $\theta$.

Now the locus 11 of FIG. 6 can be transformed to a circular locus 12 as shown in FIG. 7 by scaling in the ratio of the maximum values of Ex and Ey, on the locus 11 which are defined as Ex max=Jx and Ey Max=Jy. Thus R is transformed to a point S=(Fx, Fy), on a locus 12 where Fx=Ex/Jx and Fy=Ey/Jy.

Unless a store is provided to store a comprehensive set of values of Cx and Cy so that the maximum values of Ex and Ey corresponding to Jx and Jy respectively can be computed, a second setting cycle must be completed during which the vehicle is driven through 360° once again so that Jx and Jy can be recorded during the second setting cycle and stored.

In order to transform the point S on the locus 12 to the point L on the ideal locus as shown in FIG. 2 to provide full compensation, the point S must be moved back through 45°. Thus $$X_1 = \sqrt{\frac{1}{2}} (Fx - Fy) \text{ and } y_1 = \sqrt{\frac{1}{2}} (Fx + Fy)$$

where L=(X$_1$, Y$_1$).

Thus it will be appreciated that the bearing $\theta$ of the point L=Tan$^{-1}$ Y1/X1 which may be calculated by the processor in terms of the measurable parameters Ax max, Ax min, Ay max, Ay min, derived during the first setting cycle and Jx and Jy derived either from the first setting cycle or more simply from the second setting cycle.

Figure 8:
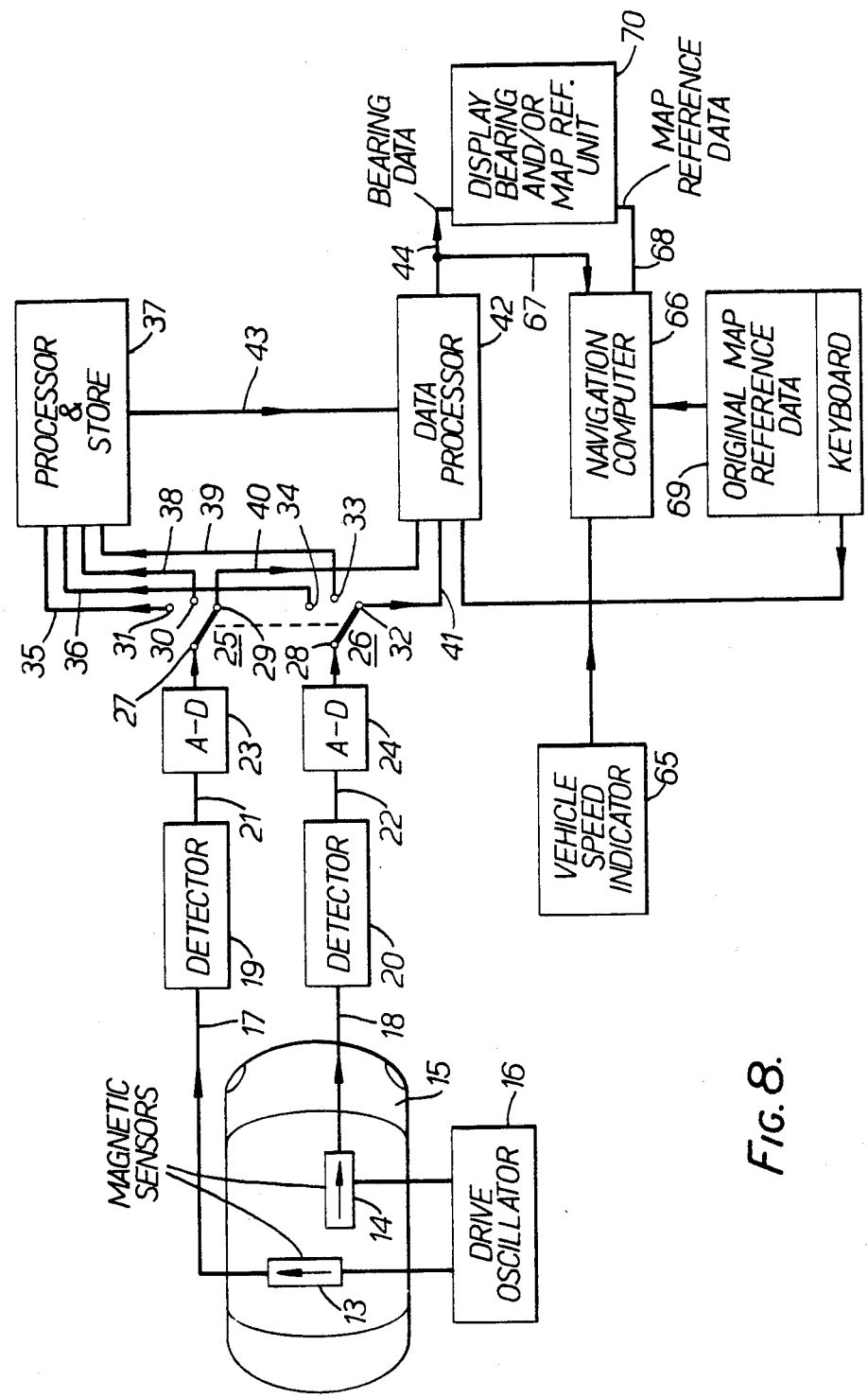
FIG. 8 is a somewhat schematic block diagram of navigation apparatus which utilises the transforms as illustrated in FIGS. 4, 5, 6 and 7.

Apparatus comprising the compass will now be described with reference to the FIG. 8. Referring to FIG. 8 the compass comprises a pair of magnetic sensing elements 13 and 14 associated with a vehicle 15 shown schematically and responsive to orthogonal components of the local magnetic field. The magnetic sensors 13 and 14 are fed from a drive oscillator 16, described in greater detail with reference to FIG. 9. Output signals from the detector elements 13 and 14 are fed via lines 17 and 18 respectively to electronic processing and amplifying units 19 and 20 respectively. It is important to appreciate that the sensors 13 and 14 are responsive only to those components of the local magnetic field which are respectively parallel with the longitudinal axis of the vehicle and parallel with an axis transverse to the longitudinal axis of the vehicle in the horizontal plane. Output signals from the units 19 and 20 on lines 21 and 22 are fed to analogue to digital convertors 23 and 24. Output signals from the analogue to digital converters 23 and 24 are fed to a pair of switch units 25 and 26, wipers 27 and 28 of the switch units being coupled to the analogue to digital converters 23 and 24 respectively. The switches 25 and 26 are ganged to operate in synchronism. The wiper 27 of the switch 25 is arranged to wipe three contacts 29, 30 and 31 and the wiper 28 of the switch 26 is arranged to wipe three contacts 32, 33 and 34. Thus signals derived from the sensor 13 and apertaining to the transverse magnetic field are feedable to the contacts 29, 30 and 31 and signals derived from the sensor 14 and apertaining to the axial magnetic field are feedable to the contacts 32, 33, 34. The contacts 31 and 34 are selected during the first setting cycle as hereinbefore described so that X and Y signals are fed via lines 35 and 36 respectively to a store 37 so that signals derived from or corresponding to Ax max, Ax min, Ay max and Ay min are stored therein. It will be appreciated that the store 37 is operatively associated with maximum and minimum signal sensing circuits (not shown) and other simple computation circuits whereby the signals Px, Py, Ix and Iy are provided for the storage elements of the store. The contacts 30 and 33 are selected during the second setting cycle and signals applied via lines 38 and 39 to the store 37 are utilized to provide the signals Jx and Jy as hereinbefore described for providing an accurate bearing indication. It will be appreciated that in this case also simple computation and max and min sensing circuits are associated with the store to produce values corresponding to Jx and Jy. The switch contacts 29 and 32 are coupled via lines 40 and 41 to a signal processor 42 which is fed also via line 43 from the store 37. The signal processor 42 performs the operations as hereinbefore described either to afford a bearing indication $\theta$ which is to a first approximation or to afford a more accurate bearing indication $\theta$. An output signal indicative of bearing is provided from the signal processor on a line 44 which is used to afford an appropriate digital display on unit 70.

The processing of the data in the signal processor is under stored program control and a keyboard 69 or a set of suitable control switches may be provided so that magnetic declination and misalignment correction data or other data can be provided. The vehicle bearing may be indicated on some form of display such as the digital display unit 70, or the data may be used to drive a CRT display or a moving map.

Installation and operation of a compass may comprise the following principal steps. Note that (5) and (6) may not be required.

(1) Mount the sensors at some convenient place in the vehicle in a horizontal plane aligned with the vehicle direction.

(2) Mount bearing indicator display in a position visible to the vehicle driver.

(3) Switch to a first calibration mode.

(4) Drive the vehicle through 360° on level ground to provide the first setting cycle data.

(5) Switch to a second calibration mode.

(6) Drive the vehicle through 360° on level ground to provide the second setting cycle data.

(7) Input magnetic declination and misalignment correction as necessary.

(8) Switch to a run mode.

(9) Instantaneous vehicle bearing is now displayed to the driver.

It will be appreciated by those skilled in the art that the elements of the signal processor, the memory, the analogue to digital converter, the electronic processing units 19 and 20 and the magnetic sensing elements 13 and 14 may take any conventional form in accordance with well established techniques. By way of example however one particular magnetic sensing arrangement will now be described with reference to FIG. 9.

Figure 9:
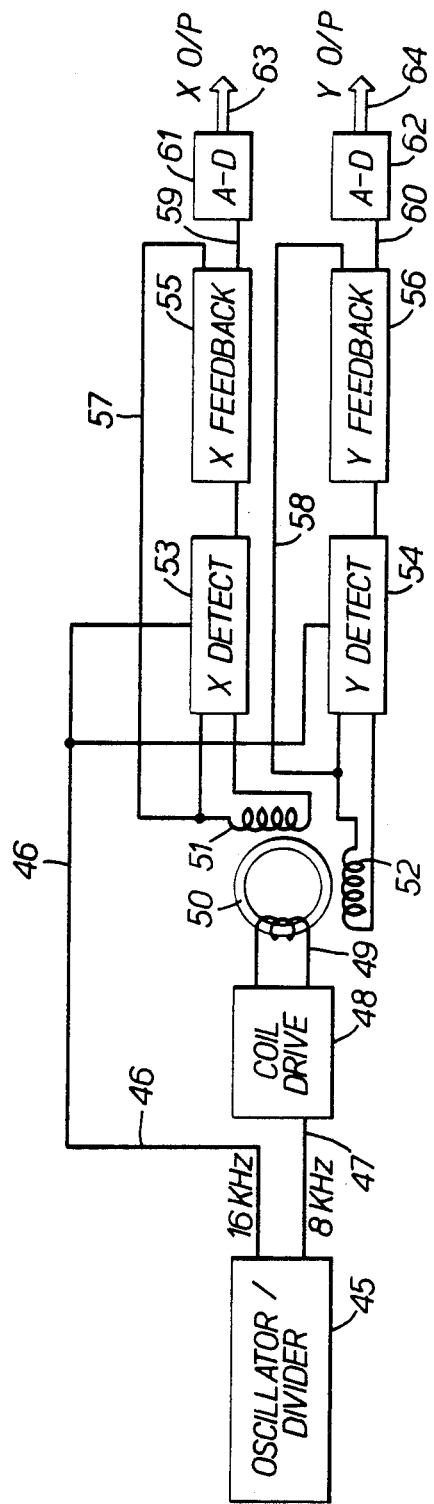
FIG. 9 is a somewhat schematic block diagram showing a part of the block diagram of FIG. 8 in more detail.

Referring now to FIG. 9, the sensing arrangement comprises a drive oscillator and divider 45 which provides an output signal at 2Fo on a line 46 and an output signal at Fo on a line 47. The line 47 feeds a coil drive amplifier 48 coupled to a drive winding 49 on a toroidal core 50. The toroidal core 50 has operatively associated with it orthogonally disposed sensor windings 51 and 52 output signals from which are fed to synchronous detectors 53 and 54 which are fed also via line 46 with the 2Fo signal derived by the oscillator 45. Output signals from the synchronous detectors 53 and 54 are fed to amplifiers 55 and 56. Feedback lines 57 and 58 from the amplifiers 55 and 56 are provided in order to linearise output signals provided on lines 59 and 60 respectively which are arranged to be fed to analogue to digital converters 61 and 62 having output lines 63 and 64 respectively. Thus the output line 63 provides a signal derived from the sensor coil 51 and the output line 64 provides a signal derived from the sensor coil 52.

It will be appreciated that the analogue to digital converters 61 and 62 correspond to the analogue to digital converters 23 and 24 as shown in FIG. 8 and therefore the signals on the lines 63 and 64 may be considered to be applied to the fixed contacts 27 and 28 respectively of the switches 25 and 26.

If a compass as just before described is utilized in a vehicle to provide an accurate bearing indication and a signal is derived indicative of the velocity of the vehicle from a speed indicator 65 then it is apparent that the change of position of the vehicle may be accurately determined and represented digitally.

Accordingly, in accordance with one embodiment of the invention navigation equipment is provided utilizing a compass as hereinbefore described and a computer or further signal processor 66 responsive to bearing signals provided on line 67 by the compass and to velocity signals derived from the speed indicator 65 adapted to provide an indication of the velocity of the vehicle with which the compass is associated, whereby the accurate location of the vehicle is indicated by the computer or further signal processor in accordance with an output signal on a line 68. The navigational apparatus may include digital switch means which constitutes or forms a part of the keyboard 69 setable to define in terms of a map reference an initial location, the computer or further processor 66 being responsive to the setting of the digital switch means 69 and to a signal on line 67 indicative of the bearing of the vehicle as afforded by the compass and to a signal indicative of the velocity of the vehicle as afforded by the speed velocity indicator 65, for providing a digital readout in dependence upon the signal on the line 68 which is fed to the display unit 70 so as to indicate the location of the vehicle from instant to instant digitally in terms of a map reference.

It will be appreciated that having once provided the data indicative of velocity, which may be provided in any conventional manner and the data indicative of bearing which is provided as hereinbefore described, the computer may be arranged to afford data apertaining to any desired parameters such as for example data indicative of a course to be maintained in order to arrive at a particular location as defined by digital data corresponding to a map reference.

Any dead reckoning navigation system will require periodic update. This could be achieved manually via the keyboard input, by constraining the system to follow only defined words as stored in the system memory, or by another navigation system, e.g. NAVSTAR.

We claim:

1. A navigation system for vehicles which includes an electronic compass comprising at least two magnetic sensors arranged in use to be respectively responsive to orthogonal components of a magnetic field which includes the earth's magnetic field and a spurious magnetic field comprising the permanent and induced magnetic fields associated with a vehicle in which the navigation system is installed, for producing electrical signals corresponding to said components, data storage means arranged to store signals derived from the sensors as the vehicle is turned through all headings during a compass setting cycle, and signal processor means responsive to electrical signals produced by the sensors in the system after the setting cycle has been completed which electrical signals must lie on the locus of an ellipse, and responsive also to the signals stored during the setting cycle, which stored signals are utilized to modify the said electrical signals in accordance with an algorithm to compensate for the permanent magnetic field by effectively repositioning the center of the ellipse to zero and to compensate for the induced magnetic field by effectively converting the elliptical shape to a circle, whereby signals are provided to the signal processor means indicative of the bearing appertaining to the heading of the vehicle in which the effects of the spurious magnetic field are compensated for, means for sensing the velocity of the vehicle in which the compass is mounted, data infeed means operable for providing data appertaining to an original map reference, navigation computer means responsive to data derived from the velocity indicator, the compass, and the data infeed means for providing data for display means whereby the display means is arranged to provide a display indicative of the position or location of the vehicle.

2. A navigation system as claimed in claim 1 wherein the data storage means is adapted to include capacity to store data corresponding to or derived from the maximum and minimum values sensed by the sensors during the setting cycle, these values being defined as Ax max, Ax min, Ay max and Ay min, and the signal processor means being adapted to solve the equation $$\tan^{-1}\theta = \frac{Cy}{Cx} \text{ where } \theta \text{ is the}$$

bearing angle, $Cx = \frac{Ax - Px}{Ix}$ and $Cy = \frac{Ay - Py}{Iy}$ ; where $$Px = \frac{Ax\,max + Ax\,min}{2} \text{ and } Py = \frac{Ay\,max + Ay\,min}{2} \text{ ; where}$$

$$Ix = \frac{Ax\,max - Ax\,min}{2} \text{ and } Iy = \frac{Ay\,max - Ay\,min}{2} \text{ ;}$$

and where Ay and Ax are signals derived from respective sensors during operation such that the effect of the subtraction operation Ax−Px and Ay−Py is to reposition the center of the eclipse to zero and such that the remainder of the mathematical operation converts the elliptical shape to a circle under a predetermined condition of induced field in which the axes of the ellipse are substantially aligned with the datum.

3. A navigation system as claimed in claim 2 wherein the data storage means includes further capacity for two further values derived from the sensors as the vehicle is rotated through all headings in the horizontal plane during a second compass setting cycle or by stored data from the first rotation, the signal processor means being adapted to utilize the values to solve the equation $$\theta = \tan^{-1}\frac{Y1}{X1}$$

where $X1 = \frac{1}{\sqrt{2}}(Fx - Fy)$ and $Y1 = \frac{1}{\sqrt{2}}(Fx + Fy)$;

where $Fx = \frac{Ex}{Jx}$ and $Fy = \frac{Ey}{Jy}$ where $Ex = \frac{1}{\sqrt{2}}(Cx + Cy)$ and $Ey = \frac{1}{\sqrt{2}}(Cy - Cx)$ where Jx=Ex max and Jy=Ey max; and where said two further values correspond to or are derived from Jx and Jy such that the foregoing mathematical operation converts the elliptical shape to a circle for all conditions of induced magnetic field.

4. A navigational system as claimed in claim 3 comprising switch means affording two switch positions one of which is used during the setting cycle for the transfer of signals derived from the sensors and corresponding or derived from Ax max, Ax min, Ay max and Ay min, to the store and the other of which is used during normal operation for the transfer of signals derived from the sensors to the signal processor.

5. A navigational system as claimed in claim 4 wherein the switch means affords an additional position utilizable during a second setting cycle for the transfer of signals derived from the sensors said signals being derived from or corresponding to Jx and Jy and being transferred to the data storage means.

6. A navigation system as claimed in claim 1 wherein the data infeed means comprises a keyboard operatively associated with the signal processor such that data appertaining to a start bearing or to bearing correction signals can be fed to the signal processor.

* * * * *